United States Patent [19]

Tucholski et al.

[11] Patent Number: 5,223,003
[45] Date of Patent: Jun. 29, 1993

[54] PROCESS FOR PREPARING A BATTERY TESTER LABEL

[75] Inventors: Gary R. Tucholski, Parma; Frank B. Tudron, Westlake; Harry R. Huhndorff, Westlake, all of Ohio

[73] Assignee: Eveready Battery Company, Inc., St. Louis, Mo.

[21] Appl. No.: 813,234

[22] Filed: Dec. 23, 1991

Related U.S. Application Data

[63] Continuation-in-part of Ser. No. 641,394, Jan. 14, 1991.

[51] Int. Cl.$^5$ .................................... H01M 10/48
[52] U.S. Cl. .................................. 29/623.4; 29/623.5; 429/93
[58] Field of Search ............... 29/623.4, 623.5, 623.1; 429/90-93

[56] References Cited

U.S. PATENT DOCUMENTS

| | | |
|---|---|---|
| 945,564 | 1/1910 | Marko . |
| 1,497,388 | 6/1924 | Sterling . |
| 3,667,039 | 5/1972 | Garfein et al. ................ 324/92 |
| 4,379,816 | 4/1983 | Mullersman et al. .......... 429/91 |
| 4,497,881 | 2/1985 | Bertolino ...................... 429/91 |
| 4,702,563 | 10/1987 | Parker ......................... 350/351 |
| 4,702,564 | 10/1987 | Parker ......................... 350/351 |
| 4,723,656 | 2/1988 | Kiernan et al. ............. 429/100 X |
| 4,737,020 | 4/1988 | Parker ......................... 350/351 |
| 4,801,514 | 1/1989 | Will et al. ................... 429/167 X |
| 4,835,474 | 5/1989 | Hanakura et al. ............ 324/435 |
| 4,835,475 | 5/1989 | Hanakura et al. ............ 324/435 |
| 4,835,476 | 5/1989 | Kurosawa .................... 324/435 |
| 4,902,108 | 2/1990 | Byker .......................... 350/357 |
| 4,911,994 | 3/1990 | Will et al. .................... 429/167 |
| 4,917,973 | 4/1990 | Yoshimoto et al. ........... 429/91 |
| 5,015,544 | 5/1991 | Burroughs et al. ............ 429/93 |
| 5,059,895 | 1/1991 | Cataldi et al. ................ 324/104 |

FOREIGN PATENT DOCUMENTS

| | | |
|---|---|---|
| 63-179269A | 7/1988 | Japan . |
| 63-213256 | 9/1988 | Japan . |
| 241365 | 3/1990 | Japan . |
| 2100269A | 4/1990 | Japan . |

*Primary Examiner*—Anthony Skapars
*Attorney, Agent, or Firm*—Robert W. Welsh

[57] ABSTRACT

Batteries have labels that are comprised of a tester for the battery.

5 Claims, 11 Drawing Sheets

PROCESS FOR PREPARING A BATTERY TESTER LABEL

RELATED APPLICATION

This application is a continuation-in-part of copending U.S. patent application Ser. No. 641,394, filed Jan. 14, 1991.

BACKGROUND OF THE INVENTION

This invention relates to batteries that have a tester included in the label on the battery.

Some typical battery testers are multilayer strips. There is generally a substrate layer onto which is deposited an electrically conductive layer that has terminal end portions. Also disposed on the substrate is a thermally sensitive material. This material changes color when heated and is in thermally transferable contact with the electrically conductive layer. When the terminals of the tester strip are placed in contact with the corresponding terminals of a battery heat will be generated in the conductive layer. The amount of heat generated is proportional to the remaining power of the battery. The heat is then transferred to the thermally sensitive material causing it to change color. These tester strips are available individually and in association with a package containing the batteries.

One disadvantage with the currently available tester strips is that the strip or package can become separated from the batteries to be tested. Because of their shape and style, the testing strips can be easily misplaced or discarded as trash. Thus, when a need arises to test batteries, it may be difficult to locate the tester strips. Also, the individual tester strips are difficult to use.

In view of these disadvantages, a tester in close association with the batteries to be tested is desired.

SUMMARY OF THE INVENTION

This invention is a process for preparing a label comprising a tester for a battery and for attaching it to a battery. The process comprises the steps of:

a) applying a conductive layer to a nonconductive base film layer, wherein the conductive layer has first and second terminal contact ends that are electrically connected to each other via an area of controlled resistivity;

b) placing a thermally sensitive material in thermally responsive contact with the area of controlled resistivity;

c) applying a layer having a color contrasting to the color of the thermally sensitive material between the conductive layer and thermally sensitive material; and d) adhering the nonconductive base film layer to the housing of the battery, such that the first and second terminal contact ends of the conductive layer are disposed in relation to the terminals of the battery to complete a circuit across the conductive layer to achieve a thermal response in the thermally responsive material.

The batteries of this invention have testers built into the label so that whenever it is desired, the battery can be tested. The batteries are easily tested by completing the tester circuit in the label, and without the use of components not associated with the battery or label. The process of this invention provides a tester label in which the response to the heat generated in the circuit is easily viewed by the consumer.

DETAILED DESCRIPTION OF THE INVENTION

The batteries useful in this invention are primary or secondary batteries that have positive and negative terminals. The batteries are generally comprised of an anode, a cathode and electrolyte contained in a sealed housing. The housing typically has an opening in one end that is sealed and closed with a cover. This cover is usually in electrical contact with either the cathode or anode to provide a terminal of the battery.

In addition to its use as an indicator of the remaining capacity of a primary cell, the label tester of this invention can be used on a rechargeable cell, e.g., a rechargeable alkaline $MnO_2$ cell, to indicate when the cell should be recharged. This can conveniently be done by an appropriate selection of the indicating material to insure its activation at a predetermined voltage level and the display of an appropriate message to the user.

The label is comprised of a means for testing the capacity of the battery. This means is comprised of a means for completing the circuit between the terminals of the battery, a means for responding to the capacity of the battery and a means for indicating the capacity of the battery. The means for completing the circuit can be a tester circuit that is comprised of an electrically conductive material. The electrically conductive material can be a metallic foil, or a metallized plastic layer. Other examples include electrically conductive paints or inks, such as those that contain graphite, carbon or metals or combinations thereof as the conductive materials. The electrically conductive material is configured to have first and second ends that are connected to each other via an area of controlled resistivity. The first end is provided to make contact with a first terminal of the battery, and the second end is provided to make contact with a second terminal of the battery. These terminal contact ends are or will be connected to the terminals of the battery to complete the tester circuit. Thus, when the tester circuit is completed, electric current can flow through the area of controlled resistivity. The term "controlled resistivity" means that the resistance is controlled to be within the range to activate the responsive means.

The resistance in the area of controlled resistivity can vary or it can be constant. In one embodiment it is desired to have a varying resistance to indicate the relative remaining useful life of a battery. For example, the current flowing through the tester circuit will generate a specific temperature. The temperature achieved will be proportional to the amount of current supplied by the battery. Thus, the area of controlled resistivity can be of varying width, e.g., tapered, or of varying thicknesses to achieve a temperature gradient. Alternatively, the area can be of constant width and constant thickness. A further alternative could involve the use of different conductive materials having different resistivities in the area of controlled resistivity. In addition, when using thermochromic materials, materials activated at different temperatures could be used along an area of constant resistance, or continuous or discontinuous segments of a thermochromic material could be used along an area of variable resistance.

The testing means can be further comprised of means for connecting the tester circuit to the terminals of the battery. This means can be terminal connectors that connect the battery terminals with the terminal contact ends of the tester circuit. The terminal contact ends of the tester circuit can be in permanent electrical contact with the terminals of the battery. However, this is only desirable when the circuit will place a very low drain on the battery so that the battery is not prematurely discharged.

Preferably, either one or both terminal contact ends of the circuit are out of contact with the terminals of the battery so that the tester circuit is open. In this embodiment, the testing means is further comprised of means for switching the tester circuit on. The tester circuit could have one or more switches. In a preferred embodiment of the invention either the anode or cathode is in electrical contact with the conductive housing of the battery. In this embodiment, one of the terminal contact ends of the tester circuit can be connected to the housing, or positioned out of contact with the housing, for example by a small opening in a layer disposed between the housing and the end of the tester circuit. This opening can act as a switch for the tester circuit. By forcing the terminal contact end into contact with the housing through the opening, the switch is closed and the tester circuit is completed to test the battery. This contact can be conveniently made by applying finger or thumb pressure to the switch areas. In an alternative switch embodiment, a circuit terminal is in permanent contact with the housing, and the switch is provided by extending an end of the circuit over the opposing terminal end of the battery. Usually the housing of the cell is in contact with the cathode to provide the positive terminal, and the end of the cell is in contact with the anode to provide the negative terminal. In this embodiment, the end of the tester circuit would extend over the negative terminal and would be spaced apart from the terminal to provide an open circuit. The circuit would be closed by forcing the end of the circuit into contact with the negative terminal of the cell. In yet another alternative, two switches could be provided by combining the opening in a layer of the label and the paced apart arrangement between the negative terminal and the extending end of the tester circuit. In this embodiment, both switches would need to be forced into contact with the cell to close the circuit.

It is also desirable that the label comprise one or two terminal connectors that are in contact with the battery terminals. When the tester circuit is used, the terminal contact ends of the tester circuit will be in contact with these terminal connectors. These terminal connectors can be in the form of conductive tabs. In one embodiment, a conductive cover acts as one terminal for the battery and one of the conductive tabs is in electrical contact with this cover. If this contact is intended to be a permanent contact, the junction between the two components can be sealed by means of an adhesive, by heat sealing, solder, or other suitable means.

The testing means further comprises a means for indicating the capacity of the battery. The indicating means will be in responsive contact with the area of controlled resistivity and will respond to and indicate a state that is present in that area. For example, a temperature increase will be generated in that area when a current flows through the tester circuit. Also, the current itself can indicate such a state. If the indicating means will be a thermally sensitive material, then it is in thermally transferable contact with the area of controlled resistivity. If the indicating means will be an electrical field or voltage sensitive material, then the indicating means will be in electrical contact with the area of controlled resistivity. The indicating means will indicate the capacity of the battery to the consumer. This indication can be qualitative such as a "good" or "bad" reading, or quantitative such as a remaining percentage of useful life.

In one embodiment, the indicating means can be a thermally sensitive material that is in thermally transferable contact with the area of controlled resistivity of the tester circuit. Thus, the heat generated in the area of controlled resistivity in the tester circuit can be transferred to the thermally sensitive material. The thermally sensitive materials change color in response to a temperature change. The material is readily viewable to a consumer and so the consumer, based on the color change, can determine whether the battery is good or needs to be replaced. To facilitate the color change effort, the thermally sensitive material can be placed over a contrasting color layer. This layer can be applied such as by printing directly onto the film base or on the electrically conductive circuit. A message can be printed or stenciled onto the contrasting color layer that can be used by the consumer when the thermally sensitive material changes color. An alternative means of providing a message can employ a stencil in the form of a thermally nonconductive layer, e.g., a layer of double-faced tape, in which the message is cut out of the thermally nonconductive layer so that a thin air insulation layer is left in that area under the thermally sensitive material. When the tester is activated, this cut-out message portion, which has poorer thermal conductivity than the surrounding area, results in the thermally sensitive material directly over the message area changing color, while the surrounding thermally sensitive material, which serves as a heat sink, remains its original color, thus outlining the message. The stencil can be reversed so that the message is made of the thermally nonconductive layer and is surrounded by the air insulation layer. When this tester is activated, the thermally sensitive material directly over the message portion will remain its original color because of better thermal conductivity, and the surrounding thermally sensitive material over the air insulation layer will change color, thereby outlining the message.

Examples of such thermally sensitive materials are liquid crystal materials and thermochromic inks. The indicating material can be used singly or in combination. For example, in one embodiment different layers of the indicating material are employed. The layers are activated at different temperatures or states and can be designed to change different colors at different temperatures. For example, the layer of material activated at the bottom layer, and the upper layers are arranged in decreasing temperature of activation with the lowest temperature material in the top layers. Alternatively, the indicating material can be designed to test the battery at different ambient temperatures by using materials that activate at different temperature. The label could include different tester circuits for different ambient temperatures. The material activatable at the corresponding temperature would be associated with the different circuits. For example, the label could be designed with a window for testing at 40° F., a window for testing at 70° F. and a window for testing at 90° F. Depending on what the ambient temperature is, the consumer would look at the corresponding window.

Examples of suitable liquid crystal materials are of the cholesteric type, such as cholesteryl oleate, cholesteryl chloride, cholesteryl caprylate and the like.

Examples of suitable thermochromic inks include those comprised of a dye, developer and desensitizing agent that are disclosed in U.S. Pat. No. 4,835,475, herein incorporated by reference. Inks can be obtained from Japan Capsule Products and Sakura Color Products Corp.

In another embodiment, the indicating and responding means can be materials that respond to a voltage change or electric field. These materials are responsive directly to the remaining capacity of the battery as the current flows through the tester circuit, and so will be disposed in electrically responsive contact with the area of controlled resistivity. Materials for this purpose are known as electrochromic materials and are commercially available from the Donnelly Corporation, for example.

The labels useful in this invention can also comprise additional insulative layers, printing layers, protective layers and the like. Suitable materials for use as the different layers are those typically used in battery labels and include plasticized or unplasticized polyvinyl chloride (UPVC), metallic films, paper and the like and they are prepared by known methods, such as laminating the layers together. The layers can be adhered to each other via an adhesive. In embodiments where conductive ink will be in contact with the adhesive, it is desirable to employ a primer layer or sealant layer between the conductive ink and adhesive. Suitable primers and adhesives include UV-curved dielectric materials such as Dielectric LV-3728-39 from Emerson and Cunning Inc., Dielectric ML-25198 from Acheson Colloids, and Liquitex acrylic gesso from Binney & Smith, Inc. The label can be attached to the battery by the use of an adhesive. The label can be in the form of individual sheets which will have a seam or in the form of a shrinkable tube in which a battery is encased.

A preferred tester label is comprised of a base insulative layer adhered to the housing of the battery. The housing is in electrical contact with either the anode or cathode of the battery. The insulative layer has an opening in it. The tester circuit is placed on the surface of this insulator. One of the terminal contact ends of the circuit is aligned with the opening in the insulator. The other terminal contact end of the circuit is in contact with the terminal of the battery that is not in contact with the housing. The indicating material is placed over the area of controlled resistivity of the circuit. The indicating material can be placed directly on the tester circuit or it can be placed on a separate layer that is placed over the tester circuit. Preferably, the indicating material is a thermochromic ink and is in thermally transferable contact with the area of controlled resistivity. Finally, a protective layer is placed over the label. The type of protective layer is selected so that the indicating material can be observed by the user. To test the battery, the user will press the label at the point above the opening in the insulator layer to establish contact between the terminal contact end of the circuit and the conductive battery housing. As the circuit is completed, a temperature increase will be generated in the area of controlled resistivity which will be transferred to the indicating material. If the desired temperature is reached, the indicating material will so indicate and the user can determine (at ambient temperature) the remaining capacity of the battery.

To prepare the individual sheet labels, a shrinkable plastic film can be printed with a thermally sensitive material in a test window area. Any graphics or decorative metallization to be included can also be printed on this film. On the reverse side of this film the electrically conductive tester circuit is printed, and an insulative layer is placed over this conductive layer. The tester circuit can also be hot stamped onto the film, or inserted as a separate component of a metal foil or metallized plastic. The insulative layer prevents the conductive layer from contacting the battery housing and provides thermal and electrical insulation. The insulative layer can completely cover the conductive layer, and terminal connectors can be used to connect the battery terminals with the terminal contact ends of the tester circuit. Alternatively, openings can be left in the insulative layer through which the conductive portion of the tester circuit can be directly connected to the terminals of the battery. An adhesive is added to the back of the label, except for the portion in which the tester circuit will contact the terminals. The tester circuit can also be printed on a continuous layer of adhesive. If so, it is desirable to add the sealer or primer layer between the tester circuit and adhesive. The adhesive side of the label is then joined to a releasable material such as a silicone-coated paper web to form a label carrier. The labels can then be die cut and converted to rolls ready for use. After applying these labels to a battery, a clear protective shrink film can be applied over the label. This film is preferably in the form of a shrink tube, and unplasticized PVC is a preferred material.

To prepare the labels on a shrinkable tube, after forming the label as generally described above the label is placed around a mandrel and welded lengthwise to form a tube. The tube is then flattened, wound on a roll and is ready for use.

In forming the labels, it is desirable that the insulative layers be built up around any openings between the battery terminals and the ends of the tester circuit. This increased thickness will assist in preventing accidental activation of the tester and resultant premature discharge of the battery.

In a preferred method, unplasticized polyvinyl chloride (UPVC) film can be metallized, e.g., aluminized, on one surface. The UPVC film will provide an insulative layer and the metallized layer can provide the conductive layer of the label. Portions of the conductive layer can be removed to establish positive and negative terminal contact ends of the tester circuit and an area of controlled resistivity. The portions can be removed by chemical etching or by photo resist techniques. Alternatively, the deposition of the aluminized layer can be done in the desired tester circuit pattern. Another layer of insulation, such as additional PVC or a UV-cured coating, such as those employing epoxy resin, or a thin foamed plastic layer is deposited over the conductive layer. The insulating layer can also be an air pocket suitably formed by the use of a thin solid spacer, e.g., of foamed plastic or adhesive, so shaped as to provide the desired dimensions. Areas of the conductive layer are exposed through this insulative layer to provide switch contact areas. One or more switch areas can be provided. Advantageously, a relatively thick layer of additional insulative material can be placed around the switch areas to increase the distance needed to close the switch and thus to ensure against inadvertent closure. A foaming ink is suitable for this purpose. This insulative layer can also be placed over the area of controlled resistivity. An adhesive layer can then be placed over this insulative layer. The adhesive layer will have openings in it so that the conductive layer can contact the terminals of the battery. This label can then be laminated to a carrier web, such as silicone-coated paper.

On the other surface of the UPVC layer is deposited an indicating material, such as a thermochromic ink. This material is placed over the area of increasing resistivity of the tester circuit. This outer layer can also contain printing and graphics. This printing or graphics can also be a contrasting color layer disposed between the tester circuit and indicating material. Thus, when the circuit is closed and the indicating material responds to the circuit, the contrasting layers with any message can be viewed. The final layer is a protective coating or film deposited over the label.

The layers and steps described above can be altered or rearranged in many ways to provide the label with a tester circuit.

Figure 1A:
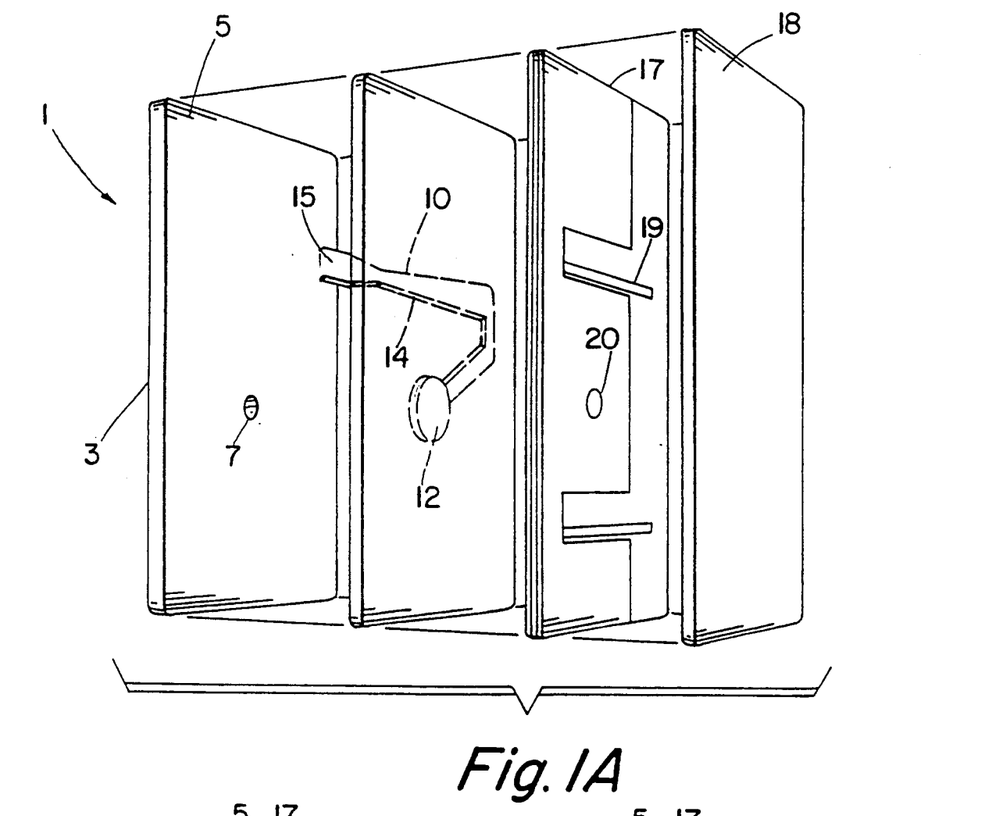
FIG. 1A shows an exploded view of a multilayered label that has a single switch area.

Referring to the Figures, FIG. 1A shows an exploded view of a tester label 1. Insulative layer 5 has opening 7. On one side of insulative layer 5 is adhesive layer 3. This side of the label 1 will be adhered to the conductive housing of a battery. On the surface of insulative layer 5 opposite the surface containing adhesive layer 3, is a tester circuit 10. The tester circuit 10 can be located directly on the surface of insulative layer 5. The tester circuit 10 is comprised of an electrically conductive material and has a first terminal contact end 12 disposed over opening 7 in the insulator layer 5. Connected to the first terminal contact end 12 is an area of controlled resistivity 14. This area is connected to the second terminal contact end in the form of tab 15 that can be placed in contact with a terminal of the battery. Over the tester circuit 10 is disposed label substrate 17. This layer comprises thermally sensitive material 19. This layer can also contain printing and can be made of plastic. This layer further comprises switch area 20 that is aligned with the first terminal contact end 12 and opening 7. Thus, the tester circuit 10 can be completed by establishing contact between first terminal contact end 12 through opening 7 to a conductive battery housing by depressing switch area 20. The thermally sensitive material 19 is disposed in thermally transferable contact with the area of increasing resistivity 14 of tester circuit 10. Optionally, protective layer 18 can be placed over label substrate layer 17. Each of the individual layers can range in thickness from about 0.5 to about 2 mils (i.e. from about 0.0005 to about 0.002 inch, or from about 12 to about 50 microns).

Figure 1B:
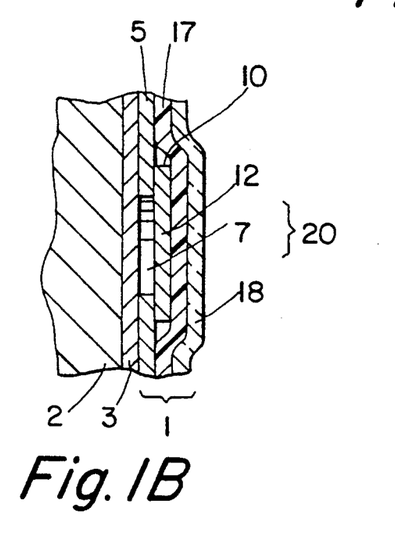
FIGS. 1B and 1C show the switch area.

FIG. 1B shows a side view of a portion of an assembled label attached to a battery. Label 1 has insulative layer 5 adhered to can 2 by adhesive layer 3. Insulative layer 5 has opening 7. Next to the insulative layer 5 is end of the tester circuit layer 10. The label 1 is completed with label substrate layer 17 next to tester circuit layer 10 and has protective layer 18 disposed on top of it.

Figure 1C:
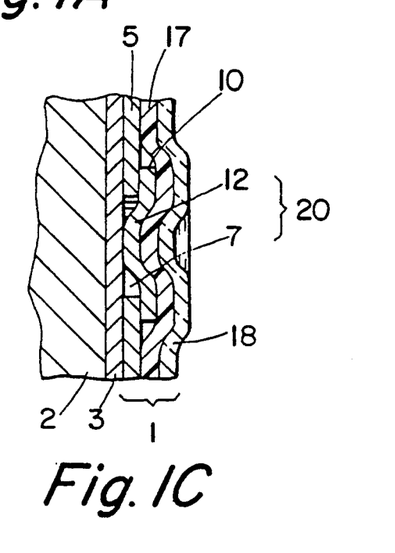

In FIG. 1C, the tester label 1 is activated by depressing the label at the switch area 20 over opening 7. Thus, end 12 of tester circuit 10 is placed in contact with can 2.

Figure 2:
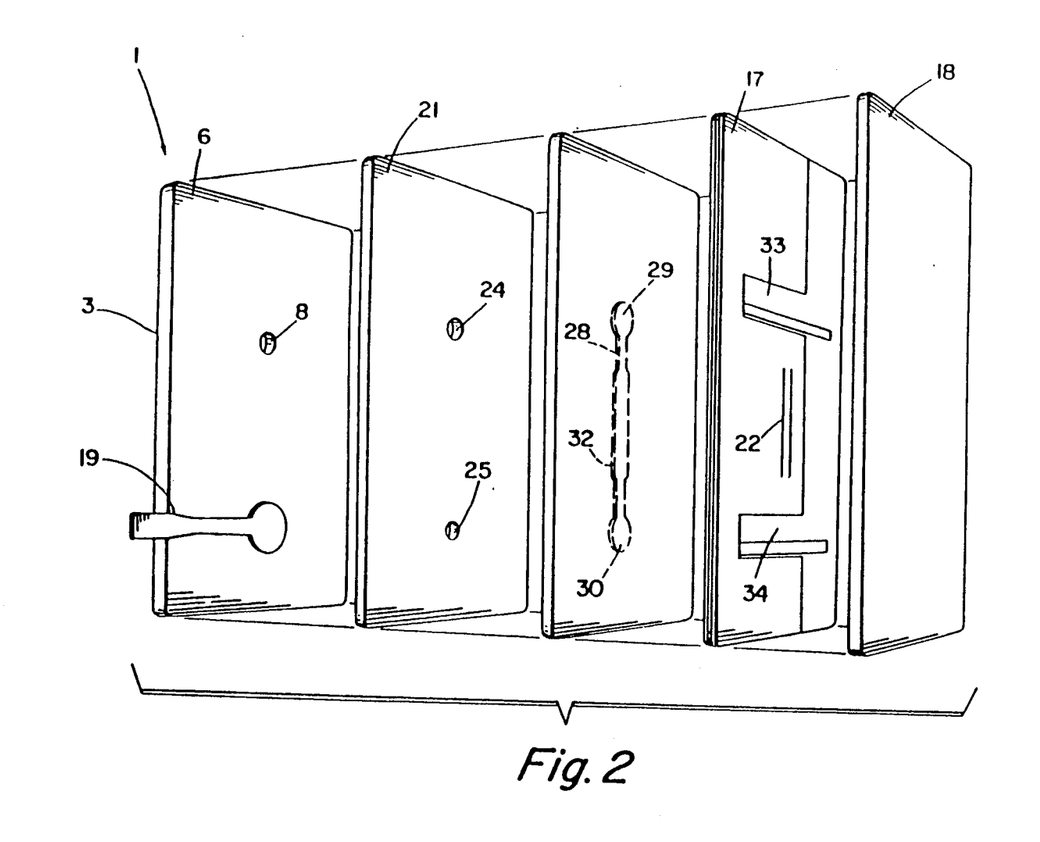
FIG. 2 shows an exploded view of a multilayered label that has two switch areas.

In FIG. 2, label 1 has the same adhesive layer 3, the same label substrate layer 17, and optional protective layer 18 as the label in FIG. 1. Insulative layer 6 in FIG. 2, has an opening and a tab 19. An additional insulative layer 21 is disposed on one surface of the first insulative layer 6. This additional insulative layer 21 has an opening 24 aligned with opening 8 in the first insulative layer 6, and a second opening 25 aligned with a portion of the tab 19. Over the second insulative layer 21 is disposed tester circuit 28. This tester circuit has a first terminal contact end 29 aligned with opening 24 in the second insulative layer 21 and a second terminal contact end 30 aligned with the second opening 25 in the second insulative layer 21. The tester circuit 28 has an area of controlled resistivity 32 connecting first terminal contact end 29 and second terminal contact end 30. Label substrate layer 17 contains thermally sensitive material 22 in alignment with the tester circuit area 32. The label substrate layer 17 has two switch areas 33 and 34. Switch area 33 is aligned with the first terminal contact end 29 of the tester circuit 28, and switch area 34 is aligned with the second terminal contact end 30 of tester circuit 28.

Figure 3:
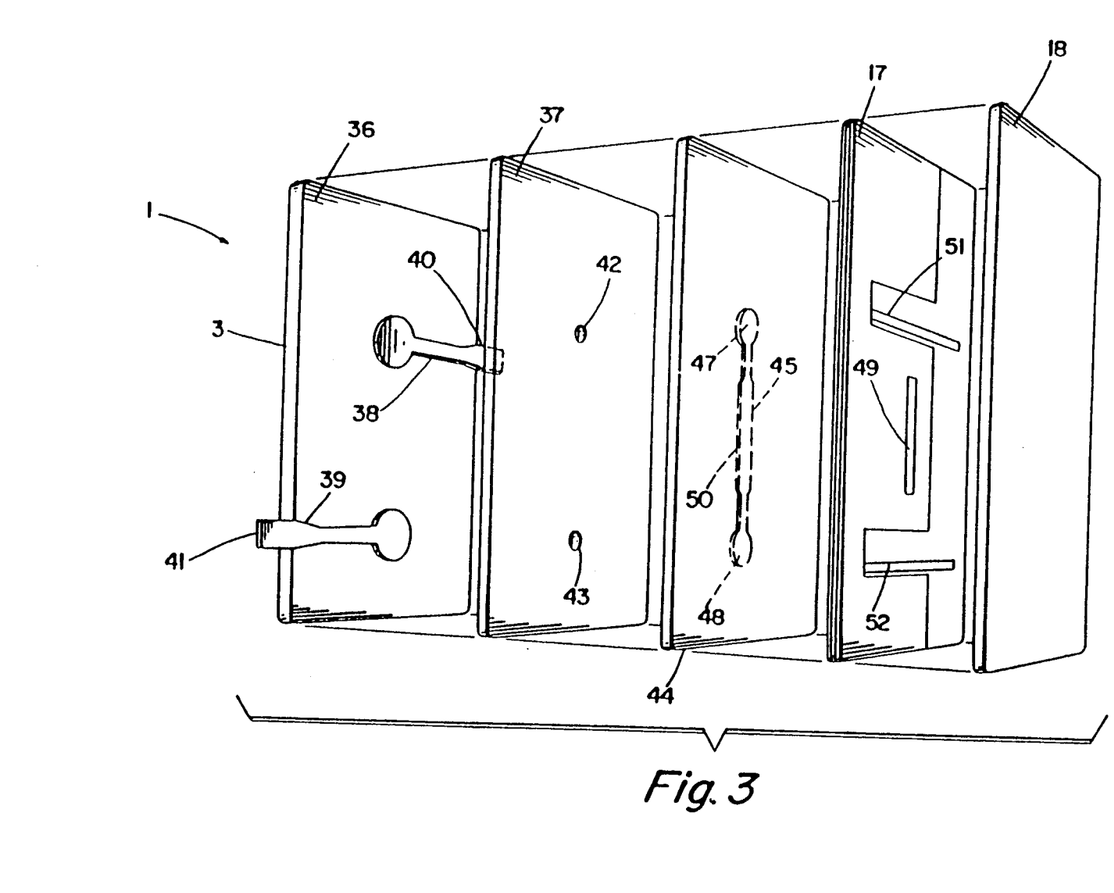
FIG. 3 shows an alternative embodiment of the dual switch multilayered label.

In FIG. 3, label 1 has the same protective layer 18, adhesive layer 3 and label substrate layer 17 as shown in the other figures. Additionally, the label 1 has an insulative layer 36 having a positive terminal connector 38 and a negative terminal connector 39. Positive terminal connector 38 has a tab 40 that will contact the positive terminal of the battery, and negative terminal connector 39 has a tab 41 that will contact the negative terminal of the battery. Next to insulative layer 36 is disposed a second insulative layer 37. This insulative layer 37 has a first opening 42 disposed over the positive terminal connector 38, and a second opening 43 aligned with the negative terminal connector 39. The next layer 44 in label 1 contains the tester circuit 45 that has first terminal contact end 47, and second terminal contact end 48 connected to each other via an area of controlled resistivity 50. The first terminal contact end 47 is aligned with the first opening 42 in insulative layer 37, and the second terminal contact end 48 is aligned with the second opening 43. Label substrate 17 which is disposed over tester circuit layer 44, has a first switch area 51 and a second switch area 52, and has thermally sensitive material 49. The first switch area 51 is aligned with first terminal contact end 47 of tester circuit 45, and the second switch area 52 is aligned with second terminal contact end 48. Because insulative layer 37 has openings 42 and 43, tester circuit 45 is open. Both contact ends 47 and 48 are out of contact with the battery terminals. By pressing both switch areas 51 and 52, terminal contact ends 47 and 48 can be placed in contact with terminal connectors 38 and 39 through openings 42 and 43 to complete the tester circuit 45.

Figure 4:
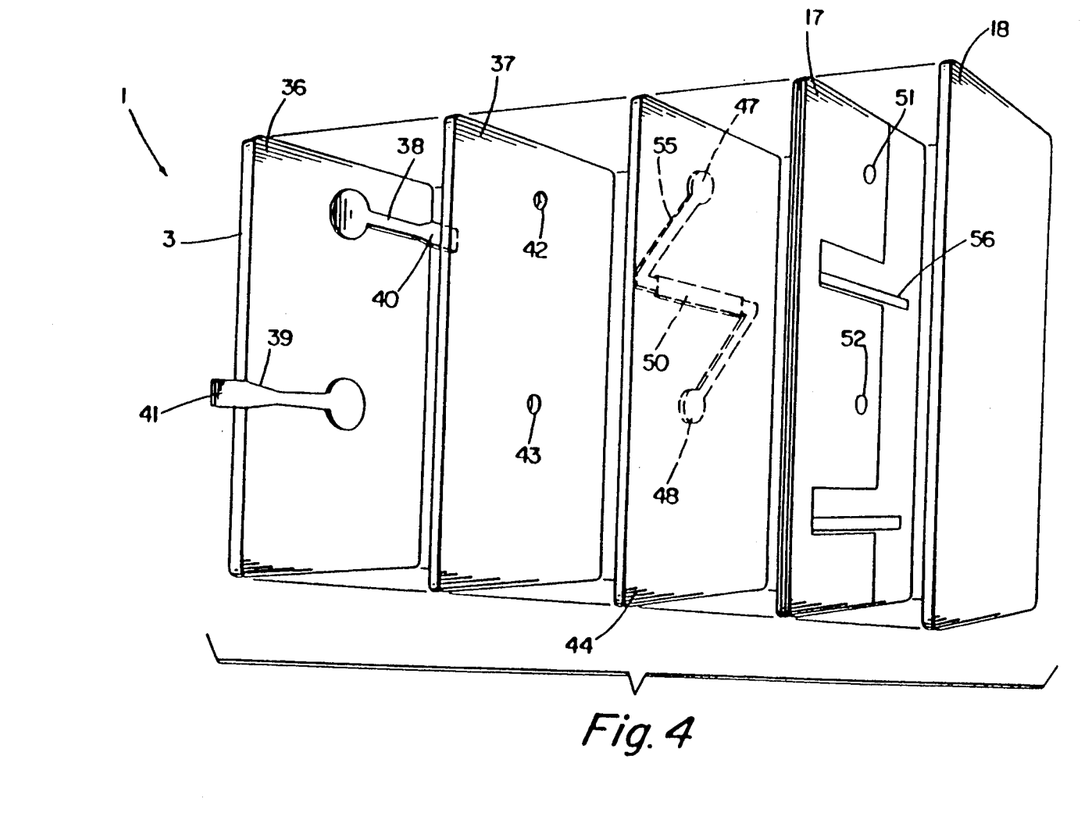
FIG. 4 shows an alternative embodiment of the dual switch multilayered label.

The label 1 depicted in FIG. 4 has the same layers as the label in FIG. 3. Area of controlled resistivity 50 and thermally sensitive material 56 in FIG. 4 are configured to run axially along the side of the battery to be labelled.

Figure 5:
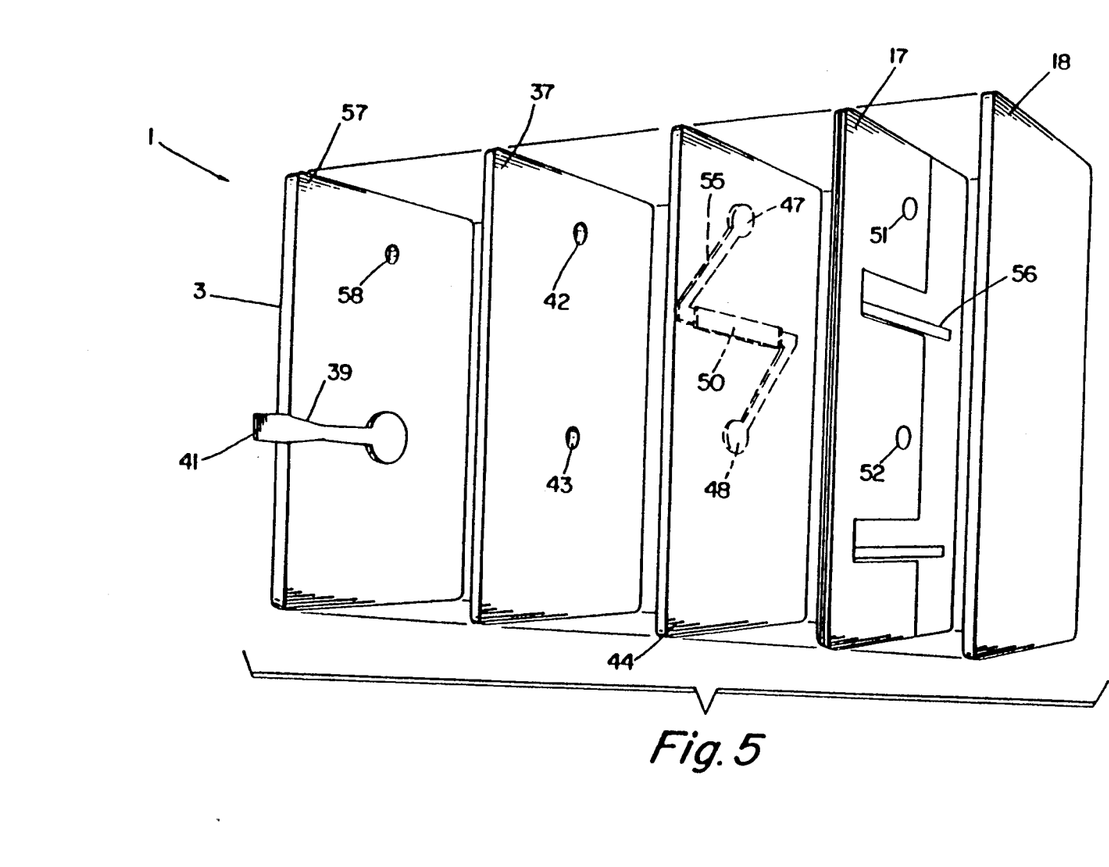
FIG. 5 shows an alternative embodiment of the dual switch multilayered label.

The label 1 depicted in FIG. 5 has the same layers and tester circuit configuration as the label 1 in FIG. 4. The label in FIG. 5 has an insulative layer 57 that contains an opening 58 and a negative terminal connector 39. Opening 58 permits contact between end 47 of tester circuit 55 and the housing of a battery to be labelled.

Figure 6:
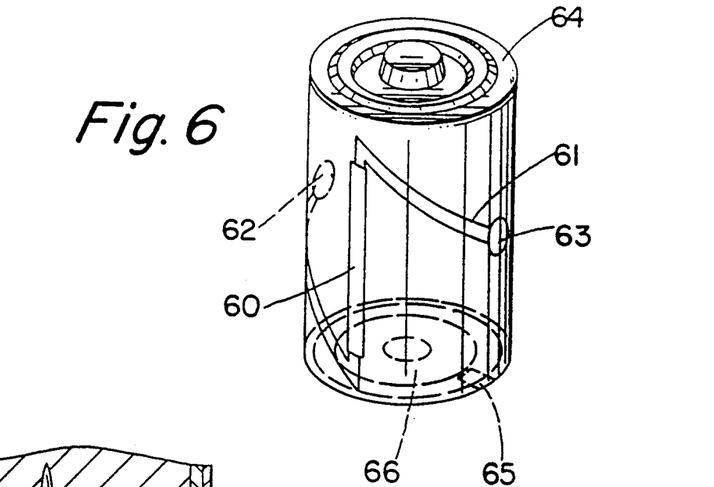
FIG. 6 shows a battery to which is attached a tester label.

In FIG. 6, label 1 has been adhered to a battery 64. Terminal contact tab 65 is shown as extending over and in contact with the bottom 66 of battery 64. In this tab configuration, it can be desirable to have a recessed area in the battery can bottom for the tab to rest. Switch areas 62 and 63 are shown to be on diametrically opposite sides of the battery 64 and can be readily activated by thumb and forefinger pressure.

Figure 7A:
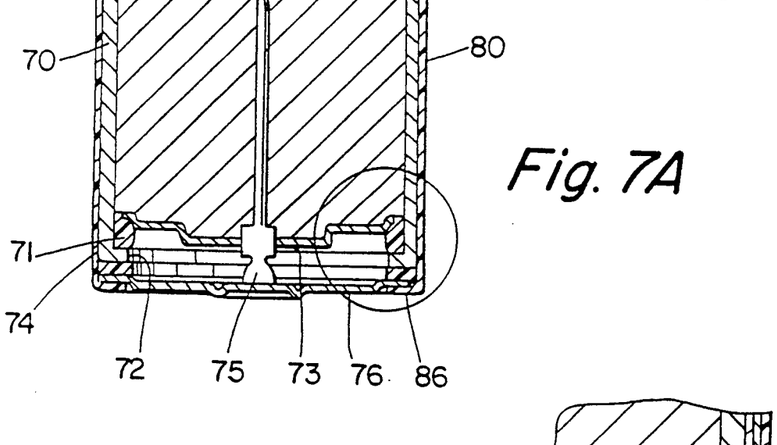
FIG. 7A shows the area of contact between the tester circuit and a terminal of the battery, and 7B is an enlargement of that area.
Figure 7B:
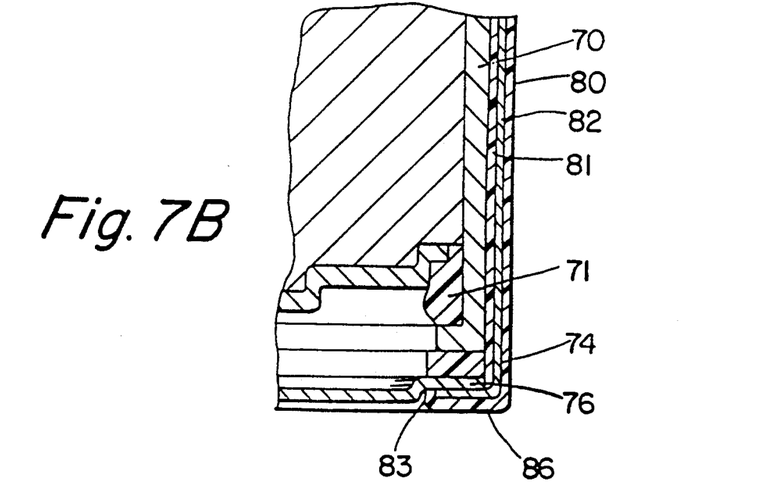

In FIG. 7A and 7B, the bottom of a battery and the tab contact between the tester circuit in the label and a battery terminal are shown. In 7A, the battery has container 70 with opening 72. The opening 72 is closed with first cover 73 that contracts anode current collector 75. Cover 73 is sealed and secured to container 70 by seal 71. Insulative annular washer 74 is placed over the opening 72 in container 70. Negative cover 76 is disposed over the annular washer 74 and is in contact with the anode current collector 75 to provide the negative terminal for the battery. Label substrate end 86 of label 80 extends over onto negative cover 76.

In 7B, the encircled portion of FIG. 7A is enlarged. The label 80 has insulative layer 81 disposed next to container 70. The terminal contact tab 82 is an extension of the tester circuit of the label and extends over and into contact with cover 76 at area 83. The label substrate end 86 extends completely over terminal contact tab 82 to conceal it. To complete labelling of the battery, the extension of label substrate 86 is heat-shrunk over and around the periphery of cover 76 to insure good electrical contact between contact tab 82 and cover 76.

Figure 7C:
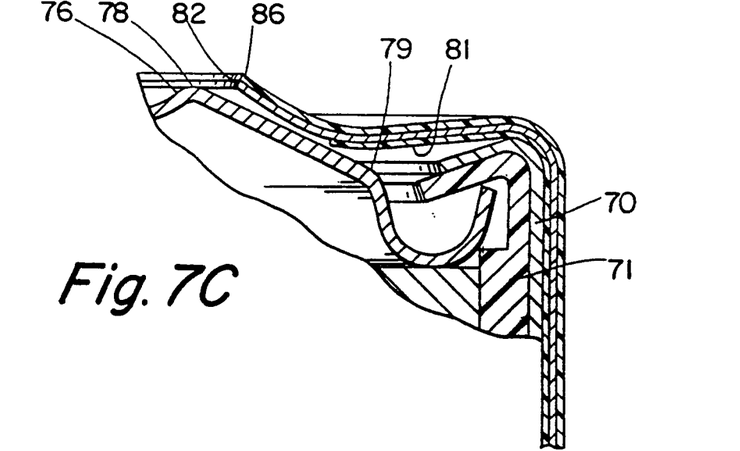
FIG. 7C shows an enlargement of the area of contact between the tester circuit and a terminal of the battery wherein the tester circuit tab is spaced apart from the terminal so as to serve as a switch.

FIG. 7C shows an enlarged portion of the bottom of a battery and the terminal contact tab 82, wherein tab contact 82 is spaced apart from the battery terminal, cover 76, so as to serve as a switch. In this embodiment, cover 76 can be shaped to have a central raised portion 78 and a peripheral lower shoulder 79. Contact tab 82 and the extension of label substrate 86 in this embodiment are out of contact with shoulder 79 until external pressure is exerted on that area to force tab 82 into contact with shoulder 79 of cover 76, thereby closing the circuit and activating the tester.

Figures 8, 9:
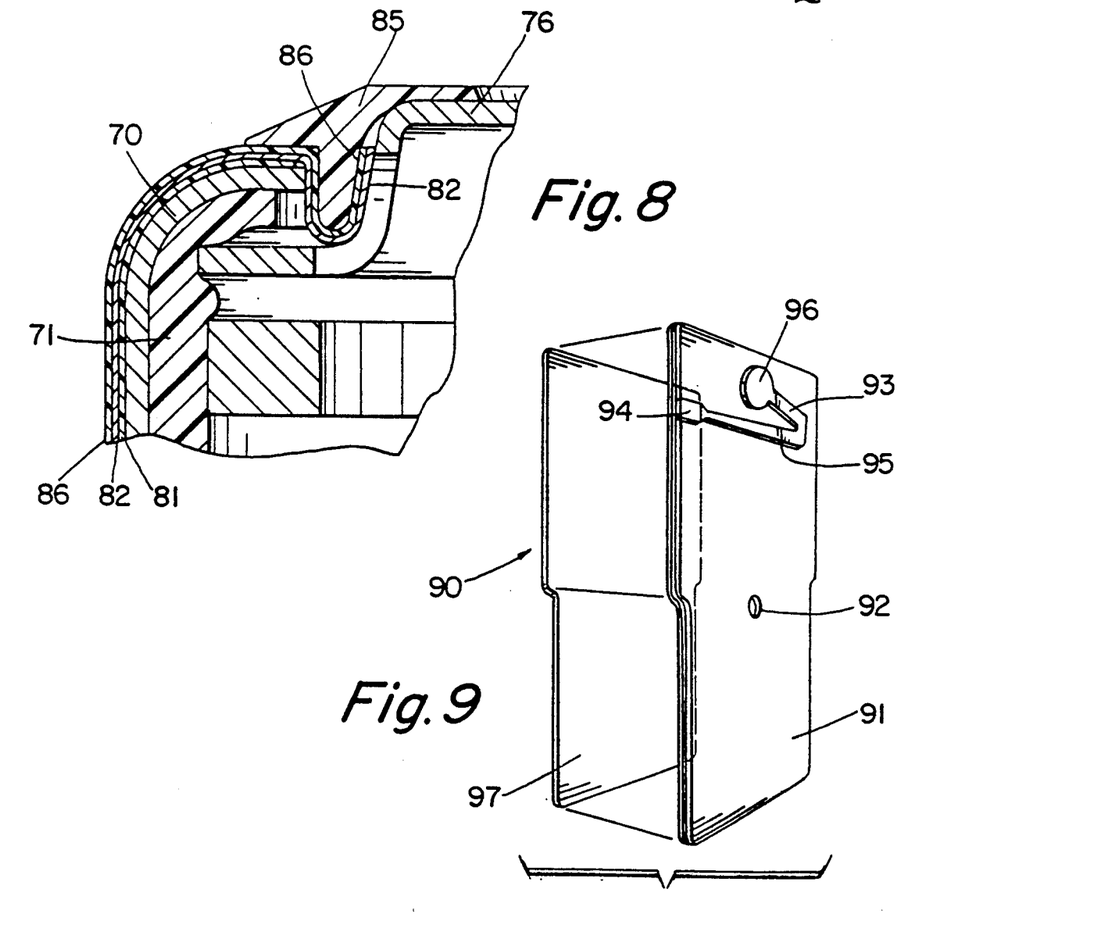
FIG. 8 shows a further embodiment wherein permanent contact between an end terminal of the battery and the tester circuit is insured through a snap ring assembly.
FIG. 9 shows a two-ply label containing a tester circuit for a battery.

In FIG. 8 is shown an embodiment of the invention wherein permanent contact between the cover 76 and terminal contact tab 82 is insured through the use of a plastic snap ring 85 which is forced into the peripheral junction between cover 76 and battery container 70 to hold tester contact tab 82 and the extension of label substrate 86 firmly in contact with cover 76. This embodiment can provide the additional function of cell reversal protection because of the extension of the top of the snap ring 85 above the cover 76.

In FIG. 9 a two-ply label is shown. Label 90 has base insulative film 91 with opening 92 and tester circuit 93. Tester circuit 93 has terminal contact tab 94, area of controlled resistivity 95 and terminal contact end 96. Protective layer 97 is placed over base film layer 91. As the label 90 is applied onto and wrapped around a battery, opening 92 will be aligned with terminal contact end 96.

Figure 10:
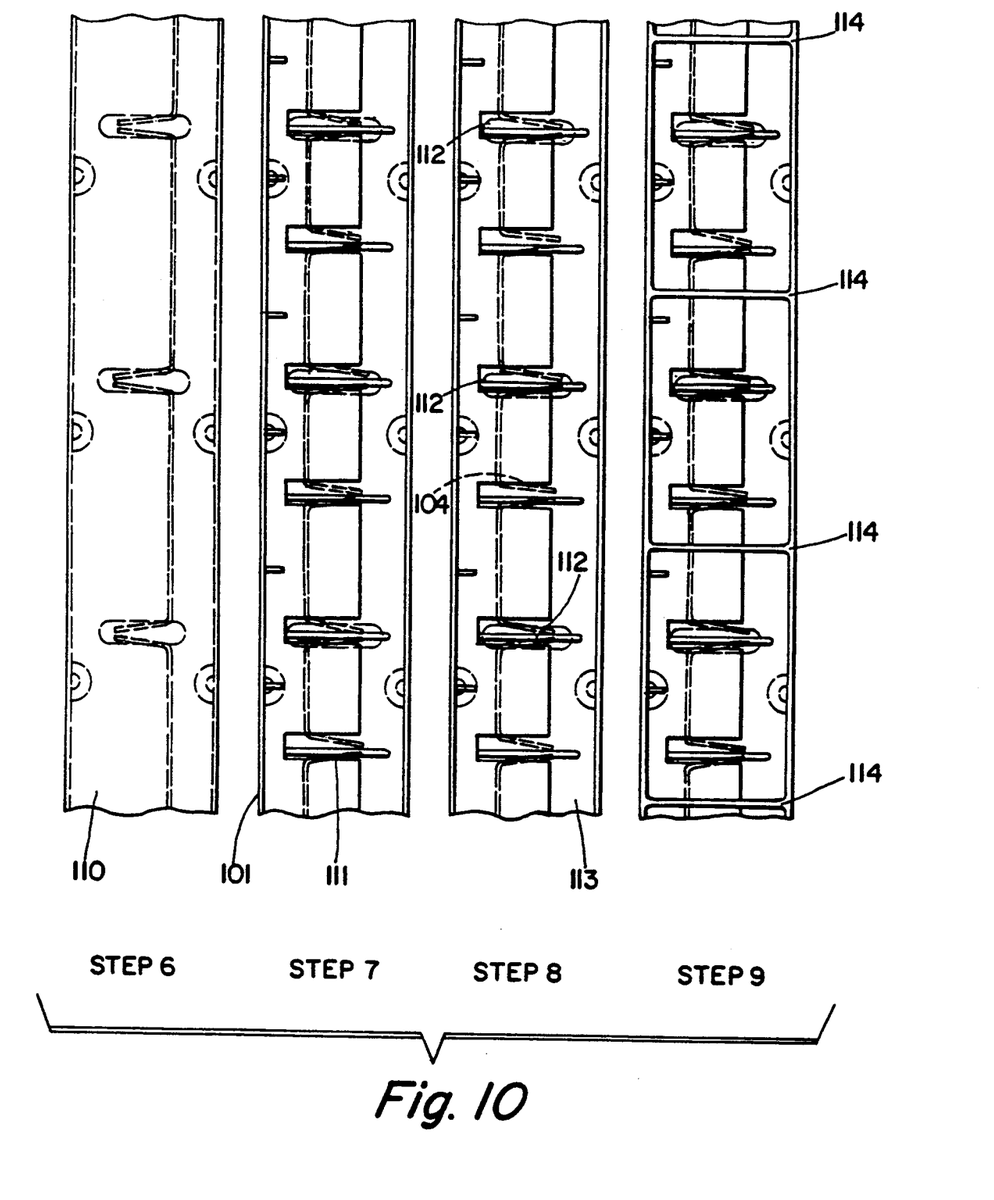
FIG. 10 and FIG. 11 show a stepwise method for making a label with a tester circuit for a battery.
Figure 11:
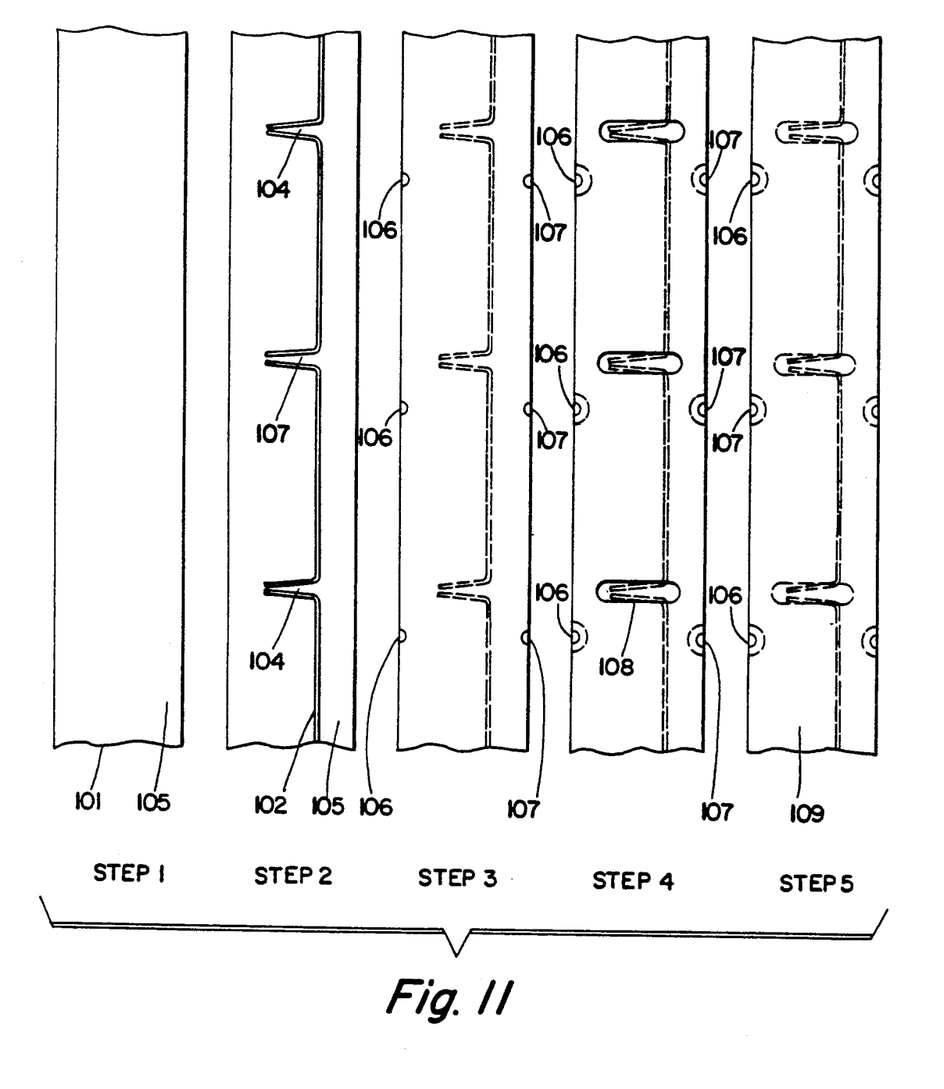

In FIG. 10 and FIG. 11, the steps for making the label with a tester are shown. FIG. 11 shows steps 1-5, and FIG. 10 shows steps 6-9. In Steps 1 to 6, the label is viewed from the backside and in Steps 7 to 9 the label is viewed from the front side. In step 1, a base film layer 101 of PVC is aluminized. In Step 2, a portion 102 of the aluminum is removed in the pattern of the tester circuit. Next, an electrical insulator is applied in Step 3 onto the aluminized surface 105 with ends 106 and 107 exposed to provide contact with the terminals of the battery. Extra insulation 108 is applied in Step 4 to area 104 of the tester circuit and ends 106 and 107. In Step 5, a pressure sensitive adhesive 109 is applied to the surface of the label, and in Step 6 the label is applied to a silicone-coated paper 110. In Step 7, the opposite side of the base PVC film 101 is printed with the label graphics 111. In step 8, a contrasting color layer and then the thermochromic ink 112 are placed over the area 104 of the tester circuit, and a protective film 113 is applied over the label. Finally, in Step 9, the label is die cut at points 114 to provide the individual labels.

Figure 12:
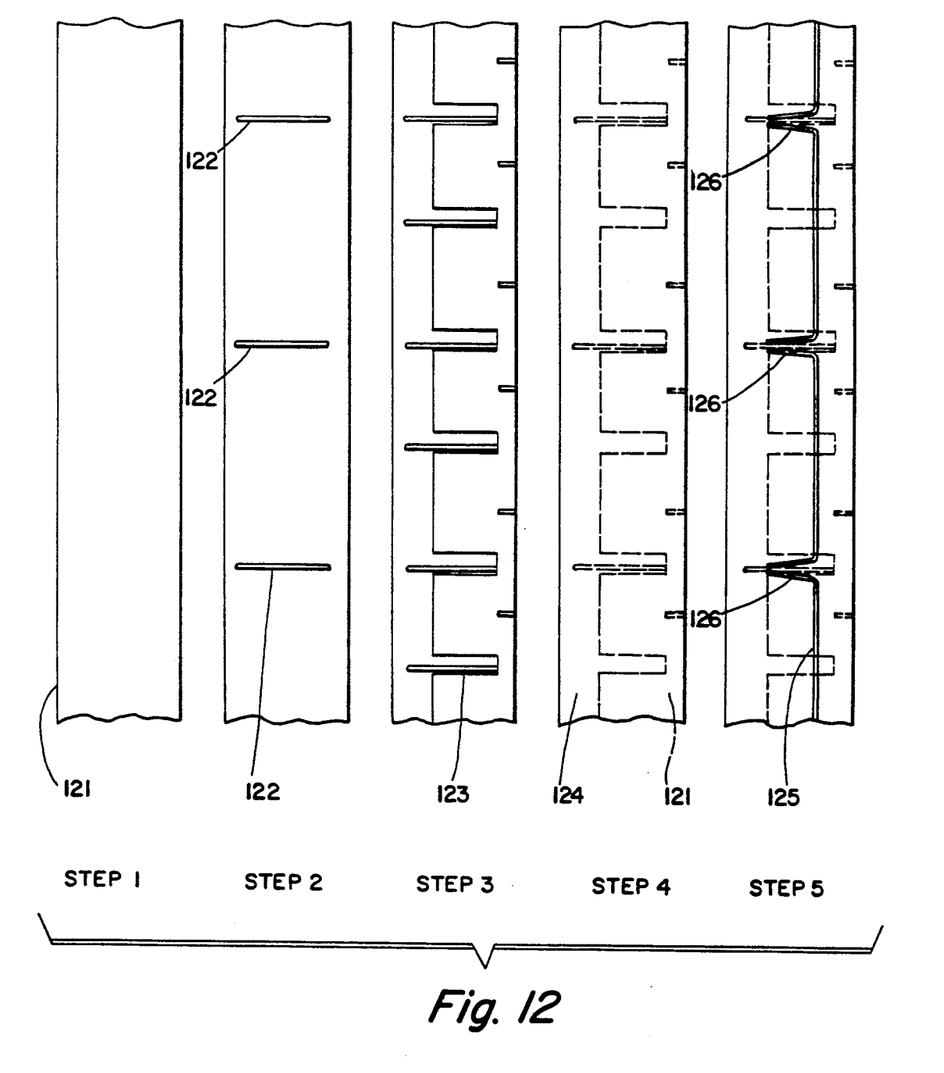
FIG. 12 and FIG. 13 show an alternative stepwise method for making a label with a tester circuit for a battery.
Figure 13:
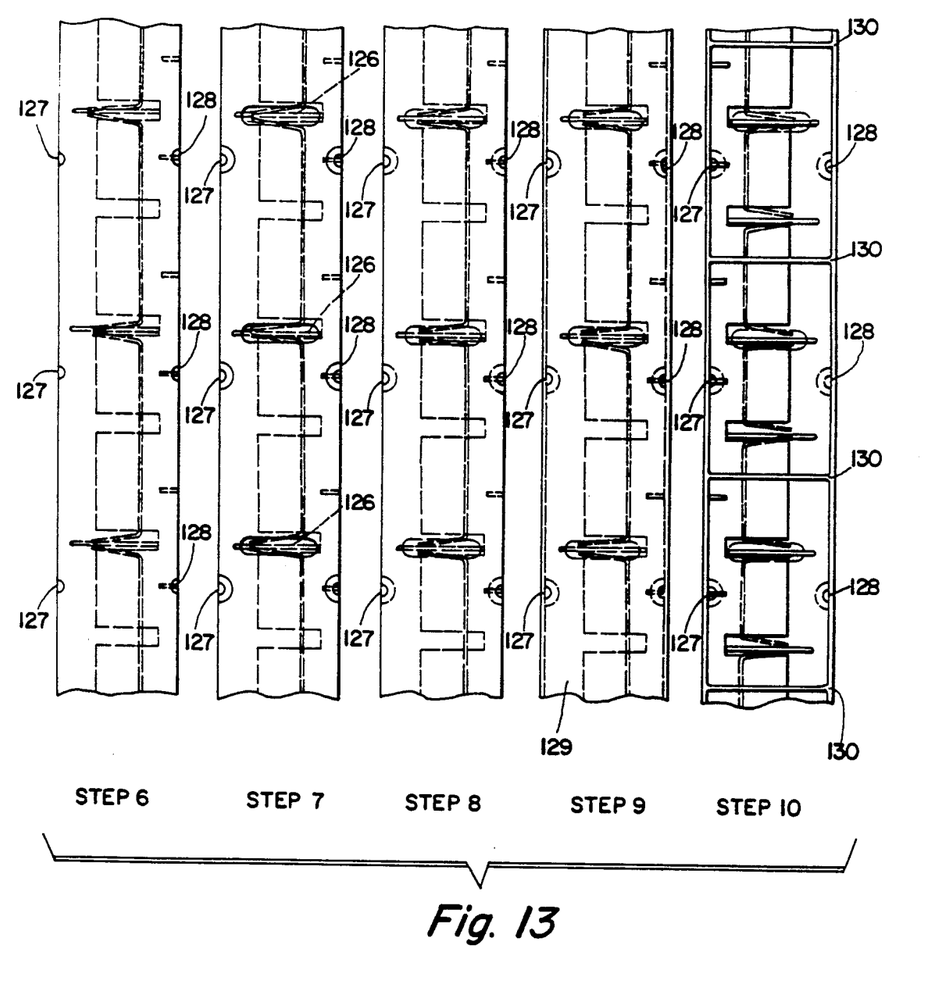

The steps can be reversed as shown in FIG. 12 and FIG. 13 with the outer protective layer forming the initial layer. FIG. 12 shows steps 1-5, and FIG. 13 shows steps 6-10. The label is viewed from the back or the battery side. In Step 1, the protective film 121 is formed. In Step 2, the thermochromic ink 122 and then a contrasting color layer are placed on the film. The label is printed with graphics 123 in Step 3 and is laminated to aluminized PVC in Step 4. The aluminized surface 124 is on the surface of the PVC opposite of the surface next to the protective film 121. In Step 5 the aluminized layer is etched in the tester circuit pattern 125 with area of controlled resistivity 126. In Step 6 an electrical insulator is applied over the aluminized surface 124 of the PVC film. Ends 127 and 128 are exposed to provide terminal contact ends for the tester circuit. In Step 7 additional insulation is placed around area 126 and ends 127 and 128 of the tester circuit. Adhesive is applied over the insulator in Step 8 and the label strip is laminated to a silicone coated paper carrier 129 in Step 9. Finally, in Step 10 the labels are die cut at 130 to the proper size.

The tester circuit shown in these Figures can of course be varied. Also the portion of the metallized surface can be exposed at different areas to provide different switch areas. To provide shrink tube labels, the labels can be formed according to the above steps and then applied around a mandrel and welded to form a tube.

In a further modification, a single-ply label can be assembled (not shown here). A heat shrinkable plastic film, e.g., PVC with 50% shrinkage in the machine direction, can be used as the base film on which is reverse printed the indicated material. Suitable graphics are then printed on the film. The conductive layer is added next by printing a conductive ink, by hot stamping or by the use of a metal foil or a metallized plastic insert. An insulation pattern is then added over the conductive layer, e.g., by printing a foaming ink or applying a layer of insulating material such as a thin foamed plastic layer. A layer of adhesive is then added and the label is laminated to a silicon-coated paper carrier as described above. If desired, a single-ply label could be made using non-shrinkable plastic in conjunction with an outer heat-shrinkable tube.

What is claimed is:

1. A process for preparing a label comprising a tester for a battery and for attaching it to a battery, comprising the steps of:
   a) applying a conductive layer to a nonconductive base film layer, wherein the conductive layer has first and second terminal contact ends that are electrically connected to each other via an area of controlled resistivity;
   b) placing a thermally sensitive material in thermally responsive contact with the area of controlled resistivity;
   c) applying a layer having a color contrasting to the color of the thermally sensitive material between the conductive layer and thermally sensitive material; and
   d) adhering the nonconductive base film layer to the housing of the battery, such that the first and second terminal contact ends of the conductive layer are disposed in relation to the terminals of the battery to complete a circuit across the conductive layer to achieve a thermal response in the thermally responsive material.

2. The process of claim 1, further comprising the steps of printing or stenciling a message onto the contrasting color layer, which can be read when the thermally responsive material responds to the completion of the circuit across the conductive layer.

3. The process of claim 1, wherein the thermally responsive material is thermochromic ink.

4. The process of claim 2, wherein the thermally responsive material is thermochromic ink.

5. The process of claim 1, wherein the housing of the battery is conductive and provides a first terminal for the battery and the first terminal contact end of the conductive circuit is in contact with the housing, and wherein one end of the battery provides the opposing terminal for the battery and the second terminal contact end of the conductive circuit is in contact with the end of the the battery.

* * * * *